United States Patent
Wolfe et al.

(10) Patent No.: US 8,859,644 B2
(45) Date of Patent: Oct. 14, 2014

(54) METHOD OF PREPARING ENCAPSULATED PIGMENT DISPERSIONS WITH MONOMERS WHICH HAVE A LOWER CRITICAL SOLUTION TEMPERATURE

(75) Inventors: Michael Stephen Wolfe, Wilmington, DE (US); Waifong Liew Anton, Wilmington, DE (US); Hee Hyun Lee, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/884,618

(22) PCT Filed: Dec. 15, 2011

(86) PCT No.: PCT/US2011/065007
§ 371 (c)(1),
(2), (4) Date: May 10, 2013

(87) PCT Pub. No.: WO2012/082964
PCT Pub. Date: Jun. 21, 2012

(65) Prior Publication Data
US 2013/0225754 A1    Aug. 29, 2013

Related U.S. Application Data

(60) Provisional application No. 61/423,232, filed on Dec. 15, 2010.

(51) Int. Cl.
| C09D 11/10 | (2014.01) |
| C08F 292/00 | (2006.01) |
| C08F 2/44 | (2006.01) |
| C09C 1/56 | (2006.01) |
| C09B 67/08 | (2006.01) |
| C09D 7/12 | (2006.01) |
| C09D 11/40 | (2014.01) |
| C09B 67/46 | (2006.01) |
| C09C 3/10 | (2006.01) |
| C09D 11/322 | (2014.01) |

(52) U.S. Cl.
CPC .............. *C09D 11/40* (2013.01); *C08F 292/00* (2013.01); *C01P 2006/22* (2013.01); *C08F 2/44* (2013.01); *C09C 1/56* (2013.01); *C09B 67/0008* (2013.01); *C09D 7/1225* (2013.01); *C09B 67/0013* (2013.01); *C09B 67/009* (2013.01); *C09C 3/10* (2013.01); *C09D 11/322* (2013.01)
USPC ............ 523/206; 524/457; 524/458; 524/461

(58) Field of Classification Search
USPC ........................... 524/457, 458, 461; 523/206
See application file for complete search history.

(56) References Cited

U.S. PATENT DOCUMENTS

| 4,597,794 A | 7/1986 | Ohta et al. |
| 5,022,592 A | 6/1991 | Zakheim et al. |
| 5,026,427 A | 6/1991 | Mitchell et al. |
| 5,085,698 A | 2/1992 | Ma et al. |
| 5,679,232 A | 10/1997 | Fedor et al. |
| 5,746,818 A | 5/1998 | Yatake |
| 5,891,231 A | 4/1999 | Guerlich et al. |
| 6,117,921 A | 9/2000 | Ma et al. |
| 6,262,152 B1 | 7/2001 | Fryd et al. |
| 6,306,994 B1 | 10/2001 | Donald et al. |
| 6,433,117 B1 | 8/2002 | Ma et al. |
| 6,450,632 B1 | 9/2002 | Tsang et al. |
| 7,544,418 B2 | 6/2009 | Vincent et al. |
| 7,741,384 B2 | 6/2010 | Liu |
| 2002/0044185 A1 | 4/2002 | Koitabashi et al. |
| 2003/0089277 A1 | 5/2003 | Zakheim et al. |
| 2005/0090599 A1 | 4/2005 | Spinelli |
| 2007/0227401 A1 | 10/2007 | Gauschow et al. |
| 2008/0064786 A1 | 3/2008 | Tanaka et al. |

FOREIGN PATENT DOCUMENTS

| EP | 0556649 A1 | 8/1993 |
| EP | 1258510 A1 | 9/2002 |

OTHER PUBLICATIONS

PCT International Search Report and Written Opinion, European Patent Office, Dated Aug. 1, 2012, Based on International Application No. PCT/US-2011/06500.

*Primary Examiner* — Vu A Nguyen
(74) *Attorney, Agent, or Firm* — Simon L. Xu

(57) ABSTRACT

Processes for encapsulating pigment dispersions is described and are used in inkjet inks providing stability with regard to heat aging test conditions and solvent challenges. Prints from these inks have better durability than prints made from dispersions that are not encapsulated.

16 Claims, No Drawings

METHOD OF PREPARING ENCAPSULATED PIGMENT DISPERSIONS WITH MONOMERS WHICH HAVE A LOWER CRITICAL SOLUTION TEMPERATURE

CROSS-REFERENCE TO RELATED APPLICATION

This application claims priority under 35 U.S.C. §119 from U.S. Provisional Application Ser. No. 61/426,232, filed Dec. 15, 2010 which is incorporated by reference in its entirety.

BACKGROUND OF THE INVENTION

The present invention pertains to a process for preparing aqueous encapsulated pigment dispersions. These dispersions may be used in the preparation of aqueous inkjet inks, pigmented paints, and the like. More particularly, the invention relates to a dispersion process where a dispersed pigment is prepared, monomers are added to the dispersed pigment and polymerization is initiated to obtain an encapsulated pigment.

Dispersion methods are commonly used to disperse particles. A variety of dispersion processes have been described for dispersing particles. For ink jet inks pigments are dispersed with polymeric dispersants. Recently, processes have been described where the polymeric dispersed pigments are subject to a process that results in encapsulated pigments.

U.S. Pat. No. 6,262,152 describes preparing encapsulated pigments where the encapsulation is achieved by using polymeric dispersants which have reactive sites and adding monomers that have substituents that can react with the reactive sites of the polymeric dispersant. For instance, the dispersant has isocyanate reactive groups and an isocyanate is added to react with the polymeric dispersant.

U.S. Pat. No. 7,741,384 describes an encapsulation process where both the pigment dispersion and the monomer dispersion are separately mixed utilizing a surfactant to independently stabilize the dispersion and the monomer.

US20080064786 describes a water insoluble polymeric dispersant for the pigment and two crosslinking steps, the first occurring in a ketone/water solvent and crosslinks the core of the polymer followed by a second crosslinking for the shell of the polymer.

US200700227401 describes an encapsulation process where the monomer is stabilized via a miniemulsion which is stabilized by a hydrophobic organic compound.

U.S. Pat. No. 7,544,418 describes an encapsulation process in which there is a polymer-encapsulated pigment where the polymer has both an acidic monomer and a non-acidic monomer.

There has been effort in the art directed at improving the stability of pigment dispersions. The effort to improve dispersion stability to date has included improvements in the processes used to make the dispersions, the development of new dispersants and the exploration of the interaction between dispersants and pigment particles, and between dispersants and aqueous vehicle. While much of the effort has general application at improving dispersion stability, some of that effort has not found utility in particular applications. For example, the pigment dispersions used in ink jet printing applications have very unique and demanding requirements. It is critical that ink components comprising pigment dispersion remain stable, not only in storage but also over repeated jetting cycles. It is also desirable that the pigment dispersions offer good durability, good rub-fastness, wet-fastness and highlighter pen fastness. As the ink jet industry moves to page-wide array printing the requirements for repeating jetting cycles may be an order of magnitude higher than the traditional Small Office/Home Office market. These emerging needs require improved pigment dispersions.

A need exists for highly stable, higher-quality and different property inks for ink-jet applications. Although improvements in polymeric dispersants have significantly contributed to improved ink-jet inks, the current dispersants still do not provide inks with the requisite stability, durability, optical density and chroma needed for ink jet applications. The present invention satisfies this need by providing encapsulated pigment dispersion based on monomers which have a Lower Critical Solution Temperature and optionally, acrylate and acrylic monomers, which are, in turn, polymerized. This results in an encapsulated pigment that has more stability, better jetting without compromise of color properties.

SUMMARY OF THE INVENTION

The present invention relates to encapsulating pigments for use in inkjet inks. The encapsulation is achieved by polymerizing monomers in the presence of a polymerically dispersed pigments where the polymeric dispersant is a random and structured polymer.

Accordingly, a method of making an aqueous encapsulated pigment dispersion, comprising the steps:
a) dispersing a pigment with a polymeric dispersant in an aqueous vehicle;
b) adding an encapsulation monomer mixture to the aqueous vehicle of step (a) at a first temperature; wherein the encapsulation monomer mixture comprises 50 to 100 weight percent of the first monomer, 0 to 50 weight percent of a second monomer, and 0 to 25 weight percent of a third monomer,
   wherein the first monomer is soluble in an aqueous solution below the first monomer's Lower Critical Solution Temperature and sparingly soluble above Lower Critical Solution Temperature,
   wherein the second monomer is a hydrophobic acrylate monomer and the third monomer is a hydrophilic acrylic monomer;
c) dispersing the encapsulation monomer/aqueous mixture using high shear mixing to form a second dispersed pigment/encapsulation monomer/aqueous mixture;
d) heating the mixture from step c) to a second temperature at least 20° C. above the first temperature;
e) polymerizing the encapsulation monomer by adding a polymerization initiator to the second dispersed pigment/encapsulation monomer/aqueous mixture.

The first monomer has the property of being soluble at a lower temperature and sparingly soluble at a higher temperature. The temperature at which the first monomer becomes sparingly soluble is the Lower Critical Solution Temperature.

The polymeric dispersants that can be used for dispersing the pigments are random or structured polymers commonly used for inkjet ink pigments. The polymeric dispersant for dispersing the pigments can be neutralized prior to, during or after the start of the dispersion process. The polymeric dispersant for the pigments may be an ionically stabilized dispersant.

Additional monomers may be added prior to the polymerization step. These additional monomers may include vinyl acetate, styrene and other monomers that contain polymerizable double bonds and di- or tri-acrylates.

In accordance with another embodiment, there is provided an aqueous pigmented ink jet ink comprising an aqueous encapsulated pigment dispersion as described above in the two methods. The pigment ink jet ink has from about 0.1 to about 75 wt % pigment based on the total weight of the ink, a surface tension in the range of about 20 dyne/cm to about 70 dyne/cm at 25° C., and a viscosity of lower than about 30 cP at 25° C.

In still another embodiment, there is provided an ink set comprising at least one cyan ink, at least one magenta ink and at least one yellow ink, wherein at least one of the inks is an aqueous encapsulated pigmented ink jet ink as set forth above and described in further detail below. This ink set is often described as a CMY ink set.

In still another embodiment, there is provided an ink set comprising at least one cyan ink, at least one magenta ink, at least one yellow ink, and at least one black ink wherein at least one of the inks is an aqueous encapsulated pigmented ink jet ink as set forth above and described in further detail below. This ink set is often described as a CMYK ink set.

Other ink sets may include additional colors, as long as at least one of the inks is an aqueous encapsulated pigmented ink jet ink as set forth above and described in further detail below.

In yet another embodiment there is provided a method for ink jet printing onto a substrate, comprising the steps of:
(a) providing an ink jet printer that is responsive to digital data signals;
(b) loading the printer with a substrate to be printed;
(c) loading the printer with an ink as set forth above and described in further detail below, or an ink jet ink set as set forth above and described in further detail below; and
(d) printing onto the substrate using the ink or inkjet ink set in response to digital data signals.

These and other features and advantages of the present invention will be more readily understood by those of ordinary skill in the art from a reading of the following detailed description. One of skill can appreciate that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, references to values stated in ranges include each and every value within that range.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight. When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

As used herein, the term "dispersion of pigment particles" is a stable dispersion of polymeric dispersed pigments which are normally used in inks and paints.

As used herein, the term "aqueous pigment dispersion" is an aqueous dispersion of pigments using polymeric dispersants.

As used herein, the term "dispersant" means a surface active agent added to a suspending medium to promote uniform and maximum separation of extremely fine solid particles often of colloidal size. For pigments, the dispersants are most often polymeric dispersants and usually the dispersants and pigments are combined using dispersing equipment.

As used herein, the term "structured polymer" means a polymer that is composed of segments that differ in composition from each other. Examples include diblock, triblock, graft and star polymers.

As used herein, the term "random polymer" means a polymer that is composed of monomers distributed in a random fashion in the polymer in much the same ratio of the monomers used in preparation of the polymer.

As used herein, the term "ionically stabilized dispersions. ISD" are polymerically stabilized dispersions where the stabilization is due to ionic stabilization with little or no steric stabilization.

As used herein, the term "drop" means a drop of liquid that is normally obtained from a laboratory dropper at room temperature and is normally about 0.04 grams for aqueous systems.

As used herein, the term "dispersible particles" are those particles that can be dispersed with polymeric dispersants.

As used herein, the term "stable dispersion" means a particle dispersion where the particle size growth is less than 10% particle size growth and no flocculation when the dispersion is stored at room temperature for at least a week.

As used herein, the term "pigment" means any substance usually in a powder form which imparts color to another substance or mixture. Disperse dyes, white and black pigments are included in this definition.

As used herein, the term "encapsulation" means to encase a pigment in a polymeric system where the polymeric system is product of polymerizing monomers in the presence of a pigment which is dispersed with a polymeric dispersant.

As used herein, the term "Lower Critical Solution Temperature, (LCST)" means the temperature at which a chemical material demonstrates a cloud point in the solvent of choice. Above this temperature the chemical material is sparingly soluble in the solvent; below the temperature the chemical is soluble.

As used herein, the term "crosslinking" means the chemical reaction between reactive groups on at least two different chemicals, were one of the chemicals it at least disubstituted or trisubstituted.

As used herein, the term "emulsion" means a stable mixture of two or more immiscible liquids held in suspension by small percentages of substances called emulsifiers.

As used herein, the term "miniemulsion" means dispersions of relatively stable oil droplets with a size in the 50 to 500 nanometer region prepared by shearing a system containing an oil, water, and a surfactant.

As used herein, the term "nonionic" means a chemical derived from ethylene oxide or propylene oxide where at least 4 of the ethylene oxide or propylene oxide groups in the chemical.

As used herein, the term "binder" means a film forming ingredient in the ink jet ink. This binder is normally added when the ink is formulated.

As used herein, the term "HSD" means High Speed dispersing.

As used herein, the term "OD" means optical density.

As used herein, the term "Gloss" means observation of reflected light from a printed surface, normally the printed substrate is glossy paper As used herein, the term "SDP" means a self-dispersible" or "self-dispersing" pigments.

As used herein, the term "free polymer", means the polymeric dispersant which is unbound to the pigment, and can be determined by gravimetric % solids on the supernatant of the sample, after the pigment is removed by centrifugation.

As used herein, the term "aqueous vehicle" refers to water or a mixture of water and at least one water-soluble organic solvent (co-solvent).

As used herein, the term "ionizable groups", means potentially ionic groups.

As used herein, the term "substantially" means being of considerable degree, almost all.

As used herein, the term "Mn" means number average molecular weight.

As used herein, the term "Mw" means weight average molecular weight.

As used herein, the term "Pd" means the polydispersity which is the weight average molecular weight divided by the number average molecular weight.

As used herein, the term "d50" means the particle size at which 50% of the particles are smaller; "d95" means the particle size at which 95% of the particles are smaller.

As used herein, the term "cP" means centipoise, a viscosity unit.

As used herein, the term "conductivity" means the property of a substance or mixture that describes its ability to transfer electricity and is reported as mS/cm, As used herein, the term "pre-polymer" means the polymer that is an intermediate in a polymerization process, and can also be considered a polymer.

As used herein, the term "AN" means acid number, mg KOH/gram of solid polymer.

As used herein, the term "neutralizing agents" means to embrace all types of agents that are useful for converting ionizable groups to the more hydrophilic ionic (salt) groups.

As used herein, the term "PUD" means the polyurethanes dispersions described herein.

As used herein, the term "GPC" means gel permeation chromatography. As used herein, the term "ETEGMA//BZMA//MAA" means the block copolymer of ethoxytriethylenegylcol methacrylate, benzylmethacrylate and methacrylic acid.

As used herein, the term "NMP" means n-Methyl pyrrolidone.

As used herein, the term "THF" means tetrahydrofuran,

As used herein, the term "Tetraglyme" means Tetraethylene glycol dimethyl ether.

As used herein, the term "Vazo® 68" is a free radical source for polymerization; the product is obtained from DuPont, Wilmington Del.

As used herein, the term "Liponics EG-1" is humectant obtained from Lipo Chemicals, Paterson, N.J.

As used herein, the term "PROXEL™ biocide" obtained from Arch Chemicals, Norwalk, Conn.

Unless otherwise noted, the above chemicals were obtained from Aldrich (Milwaukee, Wis.) or other similar suppliers of laboratory chemicals.

Encapsulated pigment particles offer another option to obtaining stable pigment particles for use in ink jet inks. The encapsulation process can result in a stabilized pigment with less polymer in the aqueous vehicle, which in turn may lead to ink jet ink formulation latitude. The encapsulated pigment can also lead to a more stable pigment dispersion and improved print properties such as durability and optical density.

While seeking new encapsulated pigments, it was found that monomers that exhibit Lower Critical Solution Temperatures can be used as the encapsulating monomer. The encapsulate pigments can be prepared by using random or structured polymers as the polymeric dispersants; direct addition of the LCST monomers to the aqueous polymerically dispersed pigment; followed by polymerization of the monomers. The monomers which have the LCST property make up the encapsulation monomer mixture with optional acrylates and acrylics. The random or structured polymers are made from acrylate and acrylic monomers.

The polymeric dispersant has a number average molecular weight of 2000 to 9500 daltons. Optionally, the molecular weight is 2000 to 6000 daltons.

The structured polymeric dispersant may be water soluble and may have a solubility of at least 10 grams of polymer/100 grams of water at 25° C. The solubility is measured in its neutralized form.

A subset of the random and structured polymer dispersants are ionically stabilized dispersants where the stabilization by the dispersant is ionic with little or any steric stabilization. These ionic polymeric dispersants were described in US Patent Application Publication No, 20050090599.

Pigments

Pigments suitable for use in the present invention are those generally well-known in the art for aqueous inkjet inks. Representative commercial dry pigments are listed in U.S. Pat. No. 5,085,698. Dispersed dyes are also considered pigments as they are insoluble in the aqueous inks used herein.

Polymerically dispersed pigments are prepared by mixing the random or structured polymeric dispersants and the pigments and subjecting the mixture to dispersing conditions. It is generally desirable to make the stabilized pigment in a concentrated form. The stabilized pigment is first prepared by premixing the selected pigment(s) and the polymeric dispersant(s) in an aqueous carrier medium (such as water and, optionally, a water-miscible solvent), and then dispersing or deflocculating the pigment. The dispersing step may be accomplished in a 2-roll mill, media mill, a horizontal mini mill, a ball mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the polymeric dispersant and the pigment under pressure. The media for the media mill is chosen from commonly available media, including zirconia. YTZ and nylon. Preferred are 2-roll mill, media mill, and by passing the mixture through a plurality of nozzles within a liquid jet interaction chamber at a liquid pressure of at least 5,000 psi.

After the milling process is complete the pigment concentrate may be "let down" into an aqueous system. "Let down" refers to the dilution of the concentrate with mixing or dispersing, the intensity of the mixing/dispersing normally being determined by trial and error using routine methodology, and often being dependent on the combination of the polymeric dispersant, solvent and pigment.

A wide variety of organic and inorganic pigments, alone or in combination, may be selected to make the ink. The term "pigment" as used herein means an insoluble colorant which includes disperse dyes as they are insoluble in the inkjet ink. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Preferably, the pigment particle size should range from about 0.005 to about 5 micron and, most preferably, from about 0.005 to about 1 micron. The average particle size as measured by dynamic light scattering is preferably less than about 500 nm, more preferably less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form.

The dispersed pigment may be purified after the dispersion process by filtration, ultrafiltration or other processes used for purification of dispersed pigments, Polymeric Dispersant The polymeric dispersant may be either a random or structured polymer. The polymer dispersant is a copolymer of hydrophobic and hydrophilic monomers. The hydrophobic monomers are acrylates and the hydrophilic monomers are acrylics.

Typical random polymeric dispersants have been described in U.S. Pat. No, 4,597,794.

The "structured polymer" can mean polymers having a block, branched, graft or star structure. Examples of structured polymers include AB or BAB block copolymers such as disclosed in U.S. Pat. No. 5,085,698; ABC block copolymers such as disclosed in EP-A-0556649; and graft polymers such as disclosed in U.S. Pat. No. 5,231,131. Other polymeric dispersants that can be used are described, for example, in U.S. Pat. Nos. 6,117,921, 6,262,152, 6,306,994 and 6,433,117.

Subsets of the random and structured polymeric dispersants described above are polymeric dispersants which stabilize the pigment with ionic stabilization and little if any steric stabilization. The ionically stabilized dispersions are designed to mimic self-dispersed pigments in that they are sensitive to salt in the dispersion. Dispersions from these ionic stabilized dispersants are characterized by a salt stability test. These ionically stabilized dispersions are the pigment dispersions used in step (a).

Thus, the aqueous pigment dispersion used in step (a) comprises a pigment and a polymeric ionic dispersant in an aqueous vehicle, wherein:
(a) the polymeric ionic dispersant is physically adsorbed to the pigment,
(b) the polymeric ionic dispersant stably disperses the pigment in the aqueous vehicle,
(c) the average particle size of the dispersion is less than about 300 nm, and
(d) when the aqueous pigment dispersion is added to about 1.5 g of an aqueous sodium chloride solution of about 0.16 molar salt, in an amount of
  (i) 0.04 grams for pigment dispersions of about 10 wt % or more solids (based upon the total weight of the dispersion),
  (ii) 0.08 grams for pigment dispersions of about 5-10 wt % solids (based upon the total weight of the dispersion), and
  (iii) 0.012 grams for pigment dispersions of about 5 wt % or less solids ased upon the total weight of the dispersion),
the pigment precipitates out of the aqueous salt solution when observed after storing for 24 hours at room temperature. Normally the 0.04 grams is obtained by adding a single drop from a laboratory dropper into the test salt solution.

Polymer dispersants suitable for use in the present invention generally comprise both hydrophobic and hydrophilic monomers. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate, and salts thereof. Also quaternary salts of dimethylaminoethyl(meth) acrylate may be employed.

Generally speaking the hydrophobic region is the part that contains the absorbing segment, which is the segment or function of the dispersant interacting with the pigment surface to effect dispersion. The hydrophilic segment is the segment that provides the stability of dispersion by interaction in the solute mixture to provide stabilization. This stabilization is characterized as steric stabilization or ionic stabilization. These phenomena were described by H Spinelli in Adv. Mater, 1998, 10, no. 15, page 1215 to 1218. The ionically stabilized polymeric dispersants described above have little if any steric stabilization.

The polymeric dispersant can be neutralized prior to the start of the dispersion process. That is, the initial mixture of solvent blend and polymer dispersant has an appropriate amount of neutralizing agent. Alternatively, the neutralizing agent may be added with the polar solvent during the dispersing process. An additional option is to have the polymeric dispersant partially neutralized in the initial mixture and add additional neutralizing agent in the polar solvent. The amount of neutralization of the polymeric dispersant in the final mixture is up to about 100% neutralized, and preferably up to about 90% neutralized.

The neutralizing agent can be hydroxides of the alkali metals, amines and the like. Examples of neutralizing agents organic bases such as mono-, di, tri-methylamine, morpholine, n-methyl morpholine; alcohol amines such as dimethylethanolamine (DMEA), methyldiethanolamine, mono-, di, and tri-ethanolamine; pyridine; ammonium hydroxide; tetra-alkylammonium salts such as tetraethylammonium hydroxide, tetraethyl-ammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal ink jet printers.

Monomers for Encapsulation

The first monomer has a Lower Critical Solution Temperature (LCST). That is, it is soluble in an aqueous solution below the LSCT and above the LCST it is sparingly soluble.

This can be observed by adding the monomer to an aqueous solution at ~5° C. and observing whether the solution is a clear, water white aqueous solution. As the temperature of the aqueous solution is raised at or above the LCST the aqueous solution will look cloudy, showing that the monomer has become insoluble, or sparingly soluble in the aqueous system. Normally the aqueous solution used for testing for LCST behavior is only water.

The temperature range for this LCST behavior can be as low as ~−20° C. up to about 85° C. The lower temperature is possible if the aqueous solution has components that depress the freezing point. Examples of this include ethylene glycol, propylene glycol and the like. In the case of an aqueous solution with little dilution with a freezing point modifier the temperature range for the LCST behavior is about 5° C. to about 85° C.

The encapsulation monomer mixture comprises the LCST monomer and optionally a second and third monomer. The second monomers are acrylates and are from 0 to 50 weight percent of the encapsulation monomer mixture. The third monomers are acrylics and are from 0 to 25 weight percent of the encapsulation monomer mixture.

Non-limiting examples of the first monomers with LCST behavior are ethoxytriethylenegylcol methacrylate, 2(2-ethoxyethoxy)ethyl acrylate, and ethylene glycol methyl ether methacrylate.

The second monomer used for the encapsulation is an acrylates and is limited to up to 50 weight percent in the encapsulation monomer mixture The acrylates are hydrophobic monomers and in general include, for example, benzyl methacrylate, butyl methacrylate, methyl methacrylate, ethyl methacrylate, propyl methacrylate, hexyl methacrylate, 2-ethylhexyl methacrylate, octyl methacrylate, lauryl methacrylate, stearyl methacrylate, phenyl methacrylate, phenoxyethyl methacrylate, methacrylonitrile, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, phenoxyethyl acrylate, glycidyl acrylate, p-tolyl acrylate, and sorbyl acrylate.

The acrylates may also include, for example, hydroxyethyl methacrylate, hydroxypropyl methacrylate, 2-ethoxyethyl methacrylate, hydroxyethyl acrylate, and hydroxypropyl acrylate and similar monomers which are more polar than acrylates that do not have hydroxyl groups. These monomers are not considered to be hydrophilic monomers.

The third monomers used in the encapsulation are acrylic hydrophilic monomers and are limited to up to 25 weight percent in the encapsulation monomer mixture. Hydrophilic monomers include, for example, methacrylic acid, acrylic acid, maleic acid, maleic acid monoester, itaconic acid, itaconic acid monoester, crotonic acid, crotonic acid monoester, N,N-dimethylaminoethyl methacrylate, N,N-diethylaminoethyl methacrylate, N,N-dimethylaminoethyl acrylate, N,N-diethylaminoethyl acrylate, t-butylaminoethyl methacrylate, t-butylaminoethyl acrylate.

Acrylates with nonionic substituents may be included in the encapsulation monomer mixture monomers. These nonionic components can be derived from ethylene oxide and propylene oxide and usually there are more than 3 of the ethylene oxide and propylene oxide groups. The total weight of these nonionic substituents is less than 20 weight percent based on the acrylates.

Other monomers may be included in the encapsulation monomers include styrene, alpha-methyl styrene, substituted styrenes, vinyl acetate, and vinyl butyrate and vinyl benzoate. This amount of these other monomers can be used at less than 10 weight percent of the acrylates.

Additional monomers can be further added to the encapsulation monomers and can include di(meth)acrylates and trimethacrylates.

The encapsulation monomer mixture may additional have surfactants or polymeric dispersants added to the mixture. The polymeric dispersants may be random or structured.

Encapsulation Process

The encapsulation process occurs when the encapsulation monomers are polymerized in the presence of the pigment which has been dispersed with a random or structured polymer. The encapsulation monomer mixture must have a monomer that exhibits a lower critical solution temperature.

The encapsulated pigment has improved stability relative to a polymerically dispersed pigment that has not been encapsulated. When the encapsulated pigment is used in an inkjet ink the prints have better durability, better storage stability, and improved performance in ink jet inks with aggressive solvent in the formulation and the optical properties are comparable to the dispersed pigments that are not encapsulated.

Prior to the encapsulation process, the encapsulation monomers are mixed into aqueous mixture which contains the polymerically dispersed pigment. The monomers may have a compatibility with the polymerically dispersed pigment such that they are associated with the polymerically dispersed pigment prior to the polymerization.

The encapsulation monomers are added to the aqueous mixture which contains the polymerically dispersed pigment at a first temperature which is below the LCST of the first monomer. This aqueous mixture of the polymerically dispersed pigments and monomers is mixed using high shear mixing. Examples of equipment for the high shear mixing includes a ultrasonicator, media mill, a horizontal mini mill, an attritor, or by passing the mixture through a plurality of nozzles within a liquid jet interaction chamber at a liquid pressure of at least 5,000 psi.

The high shear mixing is done at temperatures below the LCST of the first monomer. Optionally the high sheer mixing can be done at temperatures above LCST.

Prior to the polymerization step the mixture is heated to a temperature at least 20° C. higher than the LCST of the first monomer. Following this high shear mixing and heating that produces a mixture of the dispersed pigment and the encapsulation monomers, the polymerization of the encapsulation monomers is initiated by addition of appropriate initiators which include peroxides, azo compounds and redox initiators.

While not being bound by theory, the encapsulation monomers as they come out of solution above the LCST may be compatible with the dispersed pigment. The properties of the encapsulated pigment may lead to the conclusion that the polymer from the added encapsulation monomer mixture must be in solid mixture which surrounds the pigment. For instance, polymerically dispersed pigments can have the polymeric dispersant displaced by a strong solvent such as butyl cellosolve. When the encapsulated pigment is challenged with a strong solvent it is stable relative to the polymerically dispersed pigment which has not been encapsulated. It is expected that the polymer derived from the monomers added is an independent polymer in the solid mixture that surrounds the pigment. Furthermore, the added encapsulated monomers are not chemically reacted with the dispersant polymer. The dispersant polymer, by design, has no reactive sites with which the acrylate monomers can copolymerize. Disubstituted monomers can be used with the acrylate monomers to produce polymers with some branching.

Another way to observe the encapsulated pigment is to study the density of the encapsulated pigment before and after the encapsulation. One way to determine the density is to test the encapsulated pigment in a sucrose gradient. Different concentrations of sucrose in water are layered into a centrifuge tube and the encapsulated pigment is added. After centrifugation the encapsulated pigment will be at a level which reflects its density. The encapsulated pigment has lower density khan the polymerically dispersed pigment.

The product of this process is a stable, dispersed pigment. This stable pigment dispersion is one that has less than 10% particle size growth and no flocculation when the dispersion is stored at room temperature for at least a week. More rigorous testing that entail accelerated testing by heating samples for a week or more can also be used to determine the stability of the particle dispersions. The optimal particle dispersion stability would depend on the particle characteristics and/or final use. Another criterion for a stable disperse particle is that it can be processed under the dispersing process conditions, not gel or have other adverse properties.

The encapsulated pigments of this invention demonstrate improved storage stability, improved stability when tested in a solvent challenge procedure. The inks derived from these encapsulated pigments perform better in extended jettability tests. The printed inks are more durable than those inks which contain pigments that are not encapsulated.

Dispersion of the Pigment Particles

The dispersing step for the polymerically dispersed pigment may be accomplished in an ultrasonicator, media mill, a horizontal mini mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). The media for the media mill is chosen from commonly available media, including zirconia, YTZ, and nylon. The media can be as small as about 0.1 microns, although particles larger than 0.3 microns are commonly used. These various dispersion processes are in a general sense well known in the art, as exemplified by U.S. Pat. Nos. 5,022,592, 5,026,427, 5,891,231, 5,679,138, 5,976,232 and US20030089277. Preferred are media mill, and by-passing the mixture through a plurality of nozzles within a liquid jet interaction chamber at a liquid pressure of at least 5,000 psi. The mixing intensity required for the process is mixing normally associated with dispersion processes and not turbulent mixing of more modest mixing processes.

Combinations of dispersing equipment may be used. It may be more convenient to mix the solvent mixture, particle and polymeric dispersant in a High Speed Disperser (HSD) followed by milling in a media mill or a microfluidizer. The addition of the polar solvent may occur during the HSD portion of the processing and then the milling is continued in the media mill.

The final use of the particle dispersion may require that the solvent be removed from the particle dispersion mixture. The solvent may be removed by distillation processing, ultrafiltration or other convenient means. Any of these solvent removal methods may be incorporated into the process. The dispersing equipment and the solvent removal may be coupled and the solvent may be removed during the dispersing process and during the addition of the polar solvent.

One way to monitor the progress of the dispersion process is to measure the particle size and set a target value for the final D50 of the mixture. For typical pigments used for ink jet inks the target value of the D50 is 125 nm or less, preferably less than 100 nm. Also the D95 and the particles smaller than 204 nm can be used as a test criteria for the pigment dispersions.

A wide variety of organic and inorganic pigments, alone or in combination, may be selected for dispersion by this process. The dispersed pigment may be used in paints, inks and especially ink jet inks. The term "pigment" as used herein means an insoluble colorant and includes disperse dyes. The pigment particles are sufficiently small to permit free flow of the ink through the ink jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much defloculation in the process of preparing the inks as pigments in dry form. Representative commercial dry pigments are listed in U.S. Pat. No. 5,085,698.

The dispersed pigment may be purified after the dispersion process by filtration, ultrafiltration or other processes used for purification of dispersed pigments.

Amounts/Ratios of the Ingredients

For inkjet inks the mass ratio of pigment to polymeric dispersant ranges from about 0.33 to about 400. This ratio is based on the mass of the pigment and the polymeric dispersant added to the dispersion. For organic pigments the ratio is about 0.33 to 12, preferably 0.5 to 10. For inorganic pigments the ratio is about 3 to about 400, optionally about 5 to about 200.

The ratio of encapsulation monomer mixture to pigment for the encapsulating step is 0.1 to 10 based on the pigment and measured on a weight/weight basis. Thus, if there is 100 grams of pigment in a liter of aqueous dispersion, 10 to 1000 grams is added to the polymeric dispersion of the pigment prior to encapsulation. Optionally, the ratio of encapsulation monomer to pigment is 0.25 to 5.

In the case of organic pigments, the inkjet ink may contain up to approximately 30% of the encapsulated pigment, optionally about 0.1 to about 25%, and further from about 0.25 to about 15%, pigment by weight based on the total ink weight. If an inorganic pigment is selected, the ink will tend to contain higher weight percentages of pigment than with comparable inks employing organic pigment, and the ink may be as high as about 75% in some cases, since inorganic pigments generally have higher specific gravities than organic pigments. Examples of inorganic pigments include titanium dioxide, iron oxides, and the like.

Ink Jet Ink Components

Aqueous Carrier Medium

The aqueous carrier medium (aqueous vehicle) for the inkjet inks which utilize the encapsulated pigment described above is water or a mixture of water and at least one water-miscible organic solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thiodiglycol; (6) lower alkyl mono- or di-ethers derived from alkylene glycols, such as ethylene glycol mono-methyl (or -ethyl)ether, diethylene glycol mono-methyl (or -ethyl) ether, propylene glycol mono-methyl (or -ethyl)ether, triethylene glycol mono-methyl (or -ethyl)ether and diethylene glycol di-methyl (or -ethyl)ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium. A mixture of water and butyl carbitol is also an effective aqueous carrier medium.

The amount of aqueous carrier medium in the ink is typically in the range of about 70% to about 99.8%, and preferably about 80% to about 99.8%, based on total weight of the ink.

The aqueous carrier medium can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

Other Additives

Other additives, such as biocides, humectants, chelating agents and viscosity modifiers, may be added to the ink for conventional purposes. Biocides may be used to inhibit growth of microorganisms. Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N",N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Other polymer additives, if used, can be soluble or dispersed polymer(s). They can be any suitable polymer, for example, soluble polymers may include linear homopolymers, copolymers, block polymers or natural polymers. They also can be structured polymers including graft or branched polymers, stars, dendrimers, etc. The dispersed polymers can include latexes, polyurethane dispersions, etc. The polymers may be made by any known process including but not limited to free radical, group transfer, ionic. RAFT, condensation and other types of polymerization. Useful classes of polymers include, for example, acrylics, styrene-acrylics, urethanes and alginates. These polymer additives are added at the time an ink is made, after any encapsulation is complete.

These polymer additives can be effective in improving gloss and other properties while not sacrificing optical density. Other properties that can be affected by the polymer additives include, for example, reliability for thermal inkjet printing and image durability.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as about 30 cP at 25° C., but is typically somewhat lower. The ink has physical properties that can be adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, lower viscosity inks can be used, and may be preferred for certain applications. Thus the viscosity (at 25° C.) of the inks can be less than about 7 cps, less than about 5 cps, or even less than about 3.5 cps.

Ink Sets

Ink sets suitable for use with the present invention comprise at least three primary color inks: a cyan ink, a magenta ink and a yellow ink (CMY). The ink set may optionally contain additional inks, and particularly a black ink (making a CMYK ink set). At least one of colors must have the pigment encapsulated by the process described above.

When the ink set contains a black ink, pigment is generally preferred for black from the standpoint of high optical density. A preferred black pigment is a carbon black pigment, and optionally a Self Dispersed Pigment black may be used. However when the black is prepared by the inventive process the black ink will be a conventional black pigment with a polymeric dispersant and, in turn encapsulated by polymerizing monomers.

The ink set may further comprise a fixing solution. See, for example, U.S. Pat. Nos. 5,746,818, 6,450,632, US Patent Application Publication No. 20020044185, EP Patent Specification1258510 and US Patent Application Publication No. 20040201658.

EXAMPLES

The following examples illustrate the present invention without, however, being limited thereto. Tests listed here are those that are commonly used for testing pigment dispersions and ink jet inks.

The particle size for the pigment dispersions and the inks were determined by dynamic light scattering using a MICROTRAC UPA 150 analyzer from Honeywell/Microtrac (Montgomeryville Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution. Results are reported as D50 and D95 and particles less than 204 nm.

MW Characterization of the Polymeric Dispersants

Molecular weights of the polymers were determined by GPC using poly (methyl methacrylate) standards with tetrahydrofuran as the eluent. The molecular weight is routinely reported as number average molecular weight, Mn or optionally the weight average molecular weight Mw. The polymeric dispersants are not limited to Gaussian distribution of molecular weight, but may have other distributions such as bimodal distributions. Salt Stability Test to characterize dispersions which have ionically stabilized polymeric dispersants:

A series of different concentration aqueous salt solutions (typically NaCl) are prepared. For each salt solution, approximately 1.5 ml (about 1.5 g) is added to a small glass vial.

For a pigment dispersion "concentrate", one drop is added to the salt solution and gently mixed. For each of the tests ranges {10% or more; 5 to 10 wt % and about 5 wt %} a drop weighs about 0.04 grams The test for inks (which can be considered diluted forms of the concentrates) is very similar for the salt stability test for pigment dispersion concentrates, except that the solids content of inks is lower than that of a pigment dispersion concentrate, so the volume of ink added to the salt solution needs to be increased to maintain the same approximate amount of solids. Based on a typical ink of about 5 wt % total solids, about three times the weight of ink (as compared to concentrate) is needed.

Taking the case of the pigment dispersion concentrate mentioned above, the weight of solids from the concentrate would be about 0.006 g in about 1.5 g of the aqueous sodium chloride salt test solution, or about 0.4% by weight based on the weight of the aqueous salt test solution.

It should be noted that the 0.4% by weight number derived above is not critical for the application of the salt stability test, but can be used as a standard point if so desired. Because the results of the salt stability test are more related to the concentration of salt as compared to solids, and because it may be somewhat difficult to precisely determine the solids content of a pigment dispersion, fore standard of measurement the following convention will be adopted:

for pigment dispersions considered to be concentrates (about 10 wt % or more solids), one drop of dispersion should be used for 1.5 ml salt solution;

for more dilute pigment dispersions (such as inks having about 5 wt % solids or less), three drops of dispersion should be used for 1.5 ml salt solution; and for pigment dispersions of an intermediate solids content (inks and/or concentrates of about 5-10 wt % solids), two drops of dispersion should be used for 1.5 ml salt solution.

Based on the above, the appropriate amount of the pigment dispersion is added to the salt solution and gently mixed. After sitting undisturbed for 24 hours at room temperature, sample stability is rated as follows: Rating of 3: complete settling of pigment; transparent, uncolored liquid at top.

Rating of 2: no transparent uncolored liquid layer; definite settling onto bottom of vial observed when vial is tilted.

Rating of 1: no transparent uncolored liquid layer; very slight settling (small isolated spots) as observed during tilting of vial.

Rating of 0: no evidence of any settling. The salt concentration where settling is definitely observed (a rating of 2 or 3) is taken as the critical flocculation concentration for the pigment dispersion. It can be inferred from this test that, with increasing critical flocculation concentration, the role of polymeric (steric) stabilization becomes more dominant and electrostatic stabilization becomes a less important stabilization mechanism.

The ionically stabilized polymer dispersants which satisfy the requirements for the invention are those that give pigment dispersions that are rated at 2 or 3 at a concentration of salt of 0.16 molar. That is, ISD polymer dispersants of this invention, when associated with a pigment in an ISD, and when tested by the salt stability test, will be observed to precipitate from the test solution at 0.16 molar salt concentration. Rating criteria 2 and 3 will each meet the criteria of precipitation.

The salts used for the aqueous salt solution are lithium, sodium or potassium salts, with sodium chloride being preferred. The salt stability test is primarily used to test the non-encapsulated pigment dispersion that is used at step (a) in method one and two.

The inks were tested by printing on various substrates with HP printers. Plain paper, glossy paper and brochure paper were tested. The jettability of the inks over a long print cycle was done by printing from an HP45 printhead. The amount of ink from each drop was measured periodically and the test design was to eject up to 50 mLs of ink for each ink. The quality of this jettability was judged by the total number of mLs of ink jetted, the stability of the amount jetted and the variability of the amount jetted.

The optical density was measured using a Greytag-Macbeth SpectroEye™ instrument (Greytag-Macbeth AG, Regensdorf, Switzerland).

The durability of the image towards highlighter smear was done using a Faber-Castel highlighter pen after the printed image was allowed to dry for one hour after printing. The image was marked twice, the first mark was with a single pass with the highlighter and the second mark was with two passes with the highlighter. The amount of ink transfer into the unprinted area by the highlighter pen and damage to the image was noted by visual inspection and rated on a scale of 0 to 5 with 5 being best. The 5 rating has no smearing of and no damage to the printed image with the highlighter.

Examples

Dispersant Polymer 1 (Structured Polymer, Triblock) ETEGMA//BZMA//MAA 3.6//13.5//10.8

A 3-liter flask was equipped with a mechanical stirrer, thermometer, $N_2$ inlet, drying tube outlet, and addition funnels. Tetrahydrofuran THF, 291.3 gm, was charged to the flask. The catalyst tetrabutyl ammonium m-chlorobenzoate, 0.44 ml of a 1.0 M solution in acetonitrile, was then added to the flask Initiator, 1,1-bis(trimethylsiloxy)-2-methyl propene, 20.46 gm (0.0882 moles) was injected into the flask. Feed I [tetrabutyl ammonium m-chlorobenzoate, 0.33 ml of a 1.0 M solution in acetonitrile and THF, 16.92 gm] was started and added over 185 minutes. Feed II [trimethylsilyl methacrylate, 152.00 gm (0.962 moles)] was started at 0.0 minutes and added to the flask over 45 minutes. One hundred and eighty minutes after Feed II was completed (over 99% of the monomers had reacted) Feed III [benzyl methacrylate, 211.63 gm (1.20 moles) was started and added over 30 minutes. Forty minutes after Feed III was completed (over 99% of the monomers had reacted) Feed IV methacrylate, 78.9 gm (0.321 moles) was started and added over 30 minutes.

At 400 minutes, 73.0 gm of methanol and 111.0 gm of 2-pyrrolidone was added to the above solution and distillation began. During the first stage of distillation, 352.0 gm of material was removed. Then more 2-pyrrolidone 340.3 gm was added and an additional 81.0 gm of material was distilled out. Finally, 2-pyrrolidone, 86.9 gm total, was added.

The polymer has a composition of ETEGMA//BZMA//MAA 3.6//13.5//10.8. It has a molecular weight of Mn=4,200, acid value 162.

Dispersant Polymer 2 (Structured Polymer Diblock) 13BZMA//10MAA

A 3-liter flask was equipped with a mechanical stirrer, thermometer, $N_2$ inlet, drying tube outlet, and addition funnels. Tetrahydrofuran THF, 291.3 gm, was charged to the flask. The catalyst tetrabutyl ammonium m-chlorobenzoate, 0.44 ml of a 1.0 M solution in acetonitrile, was then added to the flask. Initiator, 1,1-bis(trimethylsiloxy)-2-methyl propene, 20,46 gm (0.0882 moles) was injected into the flask. Feed I [tetrabutyl ammonium m-chlorobenzoate, 0.33 ml of a 1.0 M solution in acetonitrile and THF, 16.92 gm] was started and added to the flask over 185 minutes. Feed II [trimethylsilyl methacrylate, 152.00 gm (0.962 moles)] was started at 0.0 minutes and added to the flask over 45 minutes. One hundred and eighty minutes after Feed II was completed (over 99% of the monomers had reacted) Feed III [benzyl methacrylate, 211.63 gm (1.20 moles) was started and added to the flask over 30 minutes. Forty minutes after Feed III was completed (over 99% of the monomers had reacted).

At 400 minutes, 73.0 gm of methanol and 111.0 gm of 2-pyrrolidone was added to the above solution and distillation began. During the first stage of distillation, 352.0 gm of material was removed. Then more 2-pyrrolidone 340.3 gm was added and an additional 81.0 gm of material was distilled out. Finally, 2-pyrrolidone, 86.9 gm total, was added.

The polymer has a composition of BZMA//MAA 13//10.

Pigment Dispersions

The pigmented dispersions were prepared using a two-step process involving a first mixing step followed by a second grinding step. The first step comprises mixing of all the ingredients, that is, pigment, dispersants, liquid carriers, neutralizing agent, and any optional additives to provide a blended "premix". Typically all liquid ingredients were added first, followed by the neutralizing agent, then the dispersants, and lastly the pigment. Mixing was done in a stirred mixing vessel, and a high-speed disperser (HSD) was used for the mixing step. A Cowels type blade was attached to the HSD and was operated at from 500 rpm to 4000 rpm, which provided optimal shear to achieve the desired mixing. Adequate mixing was usually achieved after mixing under the conditions described above for a period of from 15 to 120 minutes to obtain the premix mixture.

The second step was grinding of the premix to produce a pigmented dispersion. A lab-scale Eiger Minimill (Model M250, VSE EXP) manufactured by Eiger Machinery Inc., Chicago, Ill. was employed. Grinding was accomplished by charging about 820 grams of 0.5 YTZ® zirconia media to the mill. The mill disk was operated at a speed between 2000 rpm and 4000 rpm, and typically between 3000 rpm and 3500 rpm.

The dispersion was processed using a re-circulation grinding process with a typical flow rate through the mill at between 200 to 500 grams/minute, and more typically at 300 grams/minute. The milling may be done using a staged procedure in which a fraction of the solvent is held out of the grind and added after milling is completed. This is done to achieve optimal rheology that maximizes grinding efficiency. The amount of solvent held out during milling varies by dispersion, and is typically between 200 to 400 grams for a batch size with a total of 800 grams. Typically, the dispersions of the present invention were subjected to a total of 4 hours of milling.

For black dispersions, an alternate milling process using a Microfluidizer was used. Microfluidization is a non-media milling process in which milling is done by pigment impingement through nozzles under high pressures. Typically, pigment dispersions were processed at 15,000 psi with a flow rate of 400 grams/minute for a total of 12 passes through the mill. In making the black dispersions in the Examples, a lab-scale (Model M-110Y, available from Microfluidics of Newton, Mass.) high pressure pneumatic Microfludizer with a diamond Z Chamber was employed.

Alternatively, the pigment dispersion for step (a) was prepared using a solvent milling process, in which 6 parts of an un-neutralized dispersant were combined with 16 parts of a pigment in 50 parts of water and 27.5 parts of a solvent (methyl ethyl ketone), and sufficient KOH to neutralize the dispersant to a degree of 75%, This premix was dispersed in a High Speed Disperser (HSD) at 2000 rpm for 2 hours. The resulting premix was sufficiently milled to achieve an acceptable particle size. The milled dispersion was then distilled at 67° C. under vacuum to remove the solvent.

Encapsulation Example 1

The LCST Monomer is the ETEGMA

Nipex 180 (black) dispersion was prepared by the two step milling method described above using acrylic dispersant polymer 1 ETEGMA//BzMA//MAA 3.6//13.6//10.8 so that pigment to dispersant ratio to be 2.5. Monomer mixture was prepared by mixing 7.83 gram ETEGMA and 1.96 gram BZMA. 58.69 gram of water was added in 131.65 gram of the black base dispersion, and the monomer mixture was added to the mixture and magnetic stirred for 10 min. This mixture of pigment dispersion and monomer mixture was also sonicated for 30 min (2 sec on, 4 sec off) in ice bath with 30% of full power. The particle size data after sonication are D50 104 nm and D95 189 nm.

The sonicated mixture was transferred to 250 ml reactor equipped with an agitator and a condenser. The reactor was then heated to 82° C. 8.40 gram of 2.5% water soluble initiator, Vazo® 68 was then charged for an hour and polymerized at 82° C. for additional two hours. The particle size data after polymerization are D50 103 nm and D95 193 nm.

Encapsulation Example 2

The LCST Monomer is the ETEGMA

Nipex 180 (black) dispersion was prepared by the two step milling method described above using acrylic dispersant polymer 1 ETEGMA//BzMA//MAA 3.6//13.6//10.8 so that pigment to dispersant ratio to be 2.5. Monomer mixture was prepared by mixing 8.8 gram ETEGMA, 0.98 gram BZMA, and 0.15 gram of Ethoxylated bisphenol A dimethacrylate. 58.65 gram of water was added in 131.55 gram of the black base dispersion, and the monomer mixture was added to the mixture and magnetic stirred for 10 min. This mixture of pigment dispersion and monomer mixture was also sonicated for 30 min (2 sec on, 4 sec off) in ice bath with 30% of full power. The particle size data after sonication are D50 101 nm and D95 163 nm.

The sonicated mixture was transferred to 250 ml reactor equipped with an agitator and a condenser. The reactor was then heated to 82° C. 8.40 gram of 2.5% water soluble initiator, Vazo® 68 was then charged for an hour and polymerized at 82° C. for additional two hours. The particle size data after polymerization are D50 103 nm and D95 193 nm.

Encapsulation Example 3

The LCST Monomer is the ethylene glycol methyl ether methacrylate

Nipex 180 (black) dispersion was prepared by the two step milling method described above using acrylic dispersant polymer 1 ETEGMA//BzMA//MAA 3.6//13.6//10.8 so that pigment to dispersant ratio to be 2.5. Monomer mixture was prepared by mixing 9.92 gram Diethylene glycol methyl ether methacrylate and 0.2 gram of Triethylene glycol dimethacrylate. 59.54 gram of water was added in 130.49 gram of the black base dispersion, and the monomer mixture was added to the mixture and magnetic stirred for 10 min. This mixture of pigment dispersion and monomer mixture was also sonicated for 30 min (2 sec on, 4 sec off) in ice bath with 30% of full power.

The sonicated mixture was transferred to 250 ml reactor equipped with an agitator and a condenser. The reactor was then heated to 82° C. 8.81 gram of 2.5% water soluble initiator, Vazo® 68 was then charged for an hour and polymerized at 82° C. for additional two hours. The particle size data after polymerization are D50 108 nm and D95 192 nm.

Encapsulation Example 4

The LCST Monomer is the 2(2-Ethoxyethoxy)Ethyl Acrylate

Nipex180 (black) base dispersion was prepared by solvent milling method described above using acrylic dispersant polymer 1 ETEGMA//BzMA//MAA 3.6//13.6//10.8 so that pigment to dispersant ratio to be 2.0. The free dispersant in water and bound dispersant on pigment in the base dispersion were 19.2% and 30.8%, respectively for 100% pigment. The free dispersant was removed further by ultra filtration (UF) process. After UF process, free dispersant level decreased to 11.3% for 100% pigment. Monomer mixture was made by mixing 8.19 gram 2(2-Ethoxyethoxy)Ethyl Acrylate, 0.41 gram Hexyl Methacrylate and 0.12 gram Ethoxylated bisphenol A dimethacrylate. 40.95 gram of water was added in 159.85 gram of the black base dispersion, and the monomer mixture was added to the mixture and magnetic stirred for 10 min. This mixture of pigment dispersion and monomer mixture was also sonicated for 30 min (2 sec on, 4 sec off) in ice bath with 30% of full power. The particle size data after sonication are D50 103 nm and D95 167 nm.

The sonicated mixture was transferred to 250 ml reactor equipped with an agitator and a condenser. The reactor was then heated to 82"C. 8.75 gram of 2.5% water soluble initiator, Vazo® 68 was then charged for an hour and polymerized at 82° C. for additional two hours. The particle size data after polymerization are D50 107 nm and D95 199 nm.

Encapsulation Example 5

The LCST Monomer is the ETEGMA

Nipex 180 (black) dispersion was prepared by conventional milling method described above using acrylic dispersant polymer 2 BzMA//MAA 13//10 so that pigment to dispersant ratio to be 2.0. Monomer mixture was prepared by mixing 14.13 gram ETEGMA, 2.56 gram Alkoxylated Tetrahydrofurfuryl Acrylate (CD611, Sartomer), 0.58 gram MPEG350 and 1.92 gram Ethoxylated bisphenol A dimethacrylate. 57.55 gram of water was added in 124.01 gram of the black base dispersion, and the monomer mixture was added to the mixture and magnetic stirred for 10 min. This mixture of pigment dispersion and monomer mixture was also sonicated for 30 min (2 sec on, 4 sec off) in ice bath with 30% of full power. The particle size data after sonication are D50 102 nm and D95 168 nm.

The sonicated mixture was transferred to 250 ml reactor equipped with an agitator and a condenser. The reactor was then heated to 82° C. 8.40 gram of 2.5% water soluble initiator, Vazo® 68 was then charged for an hour and polymerized at 82° C. for additional two hours. The particle size data after polymerization are D50 485 nm and D95 1499 nm. The particle size decreased to D50 159 nm and D95 299 nm after dilution in ink vehicle.

Testing of Pigment Dispersions

The particle size as D50 and D95 were measured before and after the polymerization step. The stability of the dispersions was rated primarily on the particle size growth after storing the dispersion samples at 70° C. for seven days.

TABLE 1

Particle size data before and after polymerization

| | D50(Before polymerization) | D95(Before polymerization) | D50(After polymerization) | D95(After polymerization) |
|---|---|---|---|---|
| Example 1 | 104 nm | 189 nm | 103 nm | 193 nm |
| Example 2 | 101 nm | 163 nm | 103 nm | 193 nm |
| Example 3 | n/a | n/a | 108 nm | 192 nm |
| Example 4 | 103 nm | 167 nm | 107 nm | 199 nm |
| Example 5 | 192 nm | 168 nm | 485 nm | 1499 nm |

The Inventive Examples 1-5 show very good to excellent stability of the dispersion. The measured sizes of the dispersed pigments show little change after polymerization of the monomer. Example 5 shows a big change in particle size, probably because encapsulation polymer may be swollen into water phase and particles started flocculating. However, when the dispersion was diluted into ink, particle size became smaller, Table 2.

Ink Examples

The inventive encapsulated pigment dispersions were formulated into inventive inks 1-5. The comparable inks 1, 2-5 listed below are made with the pigment dispersions that were used to make the inventive encapsulated pigment dispersions Inventive inks 1 and 2 were made form the same pigment dispersion source. The inventive inks 1-3, 5 and the comparable inks 1, 3 and 5 had the following formulation with a 3 weight % pigment loading.

| 1,2-Hexandiol | 2 wt % |
|---|---|
| Glycerol, | 6 |
| Liponics EG-1, | 5 |

-continued

| | |
|---|---|
| 2-Pyrrolidinone | 5, |
| Ethylene Glycol | 5 |
| SURFYNOL ® 485 | 0.5 |
| PROXEL ™ biocide | 0.2, |
| Balance, water. | |

Inventive ink 4 and comparable ink 4 were prepared at 6% pigment and the following formulation.

| | |
|---|---|
| 1,2-Hexandiol | 2 wt % |
| 1,5-pentanediol | 6 |
| Liponics EG-1, | 2 |
| 2-Pyrrolidinone | 5, |
| Ethylene Glycol | 5 |
| SURFYNOL ® 485 | 0.5 |
| PROXEL ™ biocide | 0.2, |
| Balance, water. | |

These inventive ink 4 and comparable ink 4 were tested in an Epson 980 piezo printhead. The long term performance was monitored by doing a nozzle check at 10, 20 and 30 pages of printing.

The particle sizes of the inventive and comparable inks were measured in the initially formed ink and after heating the inks in an oven for seven days at 70° C.

TABLE 2

Ink properties; particle sizes

| | D50(After polymerization and formulated in ink) | D95(After polymerization and formulated in ink) | D50 (Ink aged for 7 days at 70° C. oven) | D95 (Ink aged for 7 days at 70° C. oven) |
|---|---|---|---|---|
| Example 1 | 117 nm | 181 nm | 105 nm | 187 nm |
| Example 2 | 117 nm | 187 nm | 119 nm | 187 nm |
| Example 3 | 151 nm | 261 nm | 118 nm | 183 nm |
| Example 4 | 112 nm | 178 nm | 124 nm | 198 nm |
| Example 5 | 154 nm | 256 nm | 118 nm | 206 nm |

The tests performed on the inks included jetting, oven stability and solvent challenge. The inks were printed onto brochure paper and prints tested for durability and optical density. The jetting was tested by a pen life test which prints up to 50 ml of ink from an HP45 pen. The amount of ink jetted is measured periodically. High jetting volume and consistency of the jetting volume is reported. The durability is observed by testing for highlighter smear with one or two smear tests. Oven stability is tested by putting in an oven at 70° for seven days.

The solvent challenge test of the inks were done by preparing the following test solution

| | |
|---|---|
| Ink | 73.80 weight % |
| Butyl Cellosolve | 10.00 |
| Butyl Carbitol | 16.00 |
| Triethanolamine | 0.20 |

Stability Rating:

| | 5 | 4 | 3 | 2 | 1 | 0.5 | 0 |
|---|---|---|---|---|---|---|---|
| % Change in D50/95 | <11% | to 20% | to 50% | to 75% | to 100% | to 500% | >500% |
| % Change in %204 | <2% | to −15% | to −30% | to −45% | to −60% | to −80% | >−80% |

TABLE 3

Ink properties

| | Jetting | Durability Brochure paper | OD Brochure paper | Ink Conductivity | Ink Viscosity (cP) | Oven Stability (70° C., 7 d) | Solvent Chalenge (70° C., 7 d) |
|---|---|---|---|---|---|---|---|
| Ink Example 1 | Very good Drop volume sustained with low variability | 5.0(1x), 5.0(2x) | 1.89 | 1.06 | 3.57 | Very good D50-10% D95 3% | Very good 4.7 |
| Example 2 | Excellent Drop volume sustained with low variability | 5.0(1x), 3.5(2x) | 1.94 | 1.06 | 3.56 | Very good D50 2% D95 0% | Very good 4.7 |
| Comparative Ink Example 1 | Poor Significant decline in jetting | 0.5(1x), 0(2x) | 2.06 | 0.77 | 3.19 | Very good D50-1% D95 ?? | N/A |
| Ink Example 3 | Excellent Drop volume sustained | 5.0(1x), 5.0(2x) | 2 | 1.13 | 4.34 | Very good D50-22% | 3.0 (OK) |

TABLE 3-continued

| | | Ink properties | | | | | |
|---|---|---|---|---|---|---|---|
| | Jetting | Durability Brochure paper | OD Brochure paper | Ink Conductivity | Ink Viscosity (cP) | Oven Stability (70° C., 7 d) | Solvent Chalenge (70° C., 7 d) |
| Comparative Ink Example 3 | with low variability Poor Significant decline in jetting | 0.5(1x), 0.5(2x) | 2.02 | 0.71 | 3.19 | D95-30% Very good D50 0% D95-1% | 2.2 |
| Ink Example 4 | Very good No nozzle out up to 30pages printing[2] | 5.0(1x), 3.0(2x) | 1.81 | 1.85 | 4.5 | Good D50 11% D95 11% | N/A |
| Comparative Ink Example 4 | Very good No nozzle out up to 30pages printing[2] | 1.0(1x), 1.0(2x) | 1.42(??) | 0.97 | 4.06 | Good D50-4% D95 15% | N/A |
| Ink Example 5. | Very good Drop volume sustained with low variability | 4.0(1x) 2.5(2x) | 1.93 | 1.22 | 5.49 | Very good D50-23% D95-20% | 2.3 |
| Comparative Ink Example 4 | Poor Significant decline in jetting | 2.0(1x), 1.5(2x) | 1.89 | 0.95 | 3.4 | Very good D50 3% D95-16% | 2.3 |

The inventive inks derived from the encapsulated pigments all performed well in these tests. These are especially good in the jetting test, the oven stability and solvent challenge when compared to the dispersed pigments that had not been encapsulated.

What is claimed is:

1. A method of making an aqueous encapsulated pigment dispersion, comprising the steps:
   a) dispersing a pigment with a polymeric dispersant in an aqueous vehicle;
   b) adding an encapsulation monomer mixture to the aqueous vehicle of step (a) at a first temperature; wherein the encapsulation monomer mixture comprises 50 to 100 weight percent of a first monomer, 0 to 50 weight percent of a second monomer, and 0 to 25 weight percent of a third monomer,
   wherein the first monomer is soluble in an aqueous solution below the first monomer's Lower Critical Solution Temperature and sparingly soluble above Lower Critical Solution Temperature,
   wherein the second monomer is a hydrophobic acrylate monomer and the third monomer is a hydrophilic acrylic monomer;
   c) dispersing the encapsulation monomer/aqueous mixture using high shear mixing to form a second dispersed pigment/encapsulation monomer/aqueous mixture;
   d) heating the mixture from step c) to a second temperature at least 20° C. above the first temperature; and
   e) polymerizing the encapsulation monomer by adding a polymerization initiator to the second dispersed pigment/encapsulation monomer/aqueous mixture.

2. The method of claim 1 wherein the weight ratio of encapsulation monomer mixture to pigment is from 0.1 to 10.

3. The method of claim 1 wherein the weight ratio of encapsulation monomer mixture to pigment is from 0.25 to 5.

4. The method of claim 1 wherein the first monomer has a Lower Critical Solution Temperature of between 5° and 85° C.

5. The method of claim 1 wherein the encapsulation monomer mixture further comprises a polymeric dispersant.

6. The method of claim 1 wherein the first monomer is selected from the group consisting of ethoxytriethylenegylcol methacrylate, 2-(2-ethoxyethoxy) ethyl acrylate; ethylene glycol methyl ether methacrylate, and mixtures thereof.

7. The method of claim 1 where the second monomer is selected from the group consisting of benzyl methacrylate, butyl methacrylate, cyclohexyl methacrylate, methyl methacrylate, ethyl methacrylate, propyl methacrylate, hexyl methacrylate, 2-ethylhexyl methacrylate, octyl methacrylate, lauryl methacrylate, stearyl methacrylate, phenyl methacrylate, phenoxyethyl methacrylate, methacrylonitrile, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, phenoxyethyl acrylate, glycidyl acrylate, p-tolyl acrylate, sorbyl acrylate, hydroxyethyl methacrylate, hydroxypropyl methacrylate, 2-ethoxyethyl methacrylate, hydroxyethyl acrylate, hydroxypropyl acrylate, and di- and tri-methacrylates and mixtures thereof.

8. The method of claim 1 wherein the third monomer is selected from the group consisting of methacrylic acid, acrylic acid, maleic acid, maleic acid monoester, itaconic acid, itaconic acid monoester, crotonic acid, crotonic acid monoester, N,N-dimethylaminoethyl methacrylate, N,N-diethylaminoethyl methacrylate, N,N-dimethylaminoethyl acrylate, N,N-diethylaminoethyl acrylate, t-butylaminoethyl methacrylate, t-butylaminoethyl acrylate and mixtures thereof.

9. The method of claim 1 wherein the encapsulation monomer mixture further comprises vinyl monomer selected from the group consisting of styrene, alpha-methyl styrene, substituted styrenes, vinyl acetate, and vinyl butyrate and vinyl benzoate and mixtures thereof and wherein the vinyl monomer is at most 20 weight percent of the first monomer.

10. The method of claim 1 wherein the polymeric dispersant has a number average molecular weight of 2000 to 9500 daltons.

11. The method of claim 1 wherein the pigment with a polymeric dispersant used in step (a) is purified prior to addition of the encapsulation monomer mixture to the aqueous vehicle.

12. The method of claim 11 wherein the purified method is ultrafiltration.

13. The method of claim 1 wherein the polymeric dispersant is a structured polymeric dispersant and is selected from the group consisting of block, branched, graft star polymer dispersants and mixtures thereof.

14. The method of claim 1 wherein the polymeric dispersant used in step (a) is an ionically stabilized polymeric dispersant and comprises a polymeric ionic dispersant, in an aqueous vehicle, wherein:
  (a) the polymeric ionic dispersant is physically adsorbed to the pigment,
  (b) the polymeric ionic dispersant stably disperses the pigment in the aqueous vehicle,
  (c) the average particle size of the dispersion is less than about 300 nm, and
  (d) when the aqueous pigment dispersion is added to about 1.5 g of an aqueous sodium chloride solution of about 0.16 molar salt, in an amount of
    (i) 0.04 grams for pigment dispersions of about 10 wt % or more solids (based upon the total weight of the dispersion),
    (ii) 0.08 grams for pigment dispersions of about 5-10 wt % solids (based upon the total weight of the dispersion), and
    (iii) 0.12 grams for pigment dispersions of about 5 wt % or less solids (based upon the total weight of the dispersion),
  the pigment precipitates out of the aqueous salt solution when observed after storing for 24 hours at room temperature.

15. An aqueous pigmented ink jet ink comprising the aqueous encapsulated pigment of claim 1, having from about 0.1 to about 10 wt % pigment based on the total weight of the ink, a weight ratio of pigment to dispersant of from about 0.33 to about 400, a surface tension in the range of about 20 dyne/cm to about 70 dyne/cm at 25° C., and a viscosity of lower than about 30 cP at 25° C.

16. An ink set comprising at least one cyan ink, at least one magenta ink and at least one yellow ink, wherein at least one of the inks is an aqueous pigmented ink jet ink as set forth in claim 15.

\* \* \* \* \*